US012594911B2

(12) United States Patent
Yang et al.

(10) Patent No.: US 12,594,911 B2
(45) Date of Patent: Apr. 7, 2026

(54) COMPRESSION DEVICE AND SENSOR CLEANING SYSTEM INCLUDING THE SAME

(71) Applicants: HYUNDAI MOTOR COMPANY, Seoul (KR); KIA CORPORATION, Seoul (KR)

(72) Inventors: Young Dug Yang, Seoul (KR); Sung Jun Hwang, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 193 days.

(21) Appl. No.: 18/739,693

(22) Filed: Jun. 11, 2024

(65) Prior Publication Data

US 2025/0214540 A1 Jul. 3, 2025

(30) Foreign Application Priority Data

Dec. 28, 2023 (KR) ........................ 10-2023-0193920

(51) Int. Cl.
*B60S 1/56* (2006.01)
*B60S 1/50* (2006.01)
*B60S 1/52* (2006.01)
*B60S 1/54* (2006.01)

(52) U.S. Cl.
CPC ................... *B60S 1/56* (2013.01); *B60S 1/50* (2013.01); *B60S 1/52* (2013.01); *B60S 1/548* (2013.01)

(58) Field of Classification Search
None
See application file for complete search history.

(56) References Cited

U.S. PATENT DOCUMENTS 12,491,539 B2 * 12/2025 Lee ........................... B08B 3/02

FOREIGN PATENT DOCUMENTS

KR 2018-0033475 A 4/2018
KR 2024-0045514 A 4/2024

* cited by examiner

*Primary Examiner* — Rita P Adhlakha
(74) *Attorney, Agent, or Firm* — MCDONNELL BOEHNEN HULBERT & BERGHOFF LLP

(57) ABSTRACT

A sensor cleaning system for a hydrogen vehicle includes hydrogen as fuel and includes a compression device configured to operate by a flow of the hydrogen, and one or more nozzles configured to spray a compressed fluid generated by the compression device onto a sensor.

10 Claims, 6 Drawing Sheets

COMPRESSION DEVICE AND SENSOR CLEANING SYSTEM INCLUDING THE SAME

CROSS REFERENCE TO RELATED APPLICATIONS

This application claims under 35 U.S.C. § 119 (a) the benefit of priority to Korean Patent Application No. 10-2023-0193920, filed on Dec. 28, 2023, the entire contents of which are incorporated herein by reference.

TECHNICAL FIELD

The present disclosure relates to a sensor cleaning system, and more particularly, to a sensor cleaning system of a hydrogen vehicle.

BACKGROUND

Recently, vehicles are equipped with a driver assistance system which assists a vehicle driver to secure safe driving in various driving situations. In addition to the driver assistance system, research and development on autonomous vehicles that can drive on their own without driver intervention is being actively conducted.

Various types of environmental sensors that can detect the surrounding environment in various ways are installed in vehicles in the driver assistance system and autonomous vehicles. The environmental sensors mounted on vehicles include a radio detection and ranging (RADAR) sensor, a light detection and ranging (LiDAR) sensor, and a camera.

Since these sensors are mounted on the outside of the vehicle, sensing areas can easily become dirty due to foreign materials, such as dust, rain, or snow. In order to maintain sensor performance, since these sensors should be kept clean above a certain level, vehicles are equipped with a sensor cleaning system that can clean the sensors when the sensing areas are contaminated.

SUMMARY

The present disclosure has been made in an effort to solve the above-described problems associated with prior art.

In one aspect, the present disclosure provides a compression device that can generate an air curtain on an environmental sensor of a hydrogen vehicle at all times.

In another aspect, the present disclosure provides a sensor cleaning system including the compression device.

Objectives of the present disclosure are not limited to the above-described objectives, and other objectives of the present disclosure, which are not described, can be clearly understood to those skilled in the art to which the present disclosure pertains from the following description.

A feature of the present disclosure for achieving the above described objectives of the present disclosure and performing characteristic functions thereof, which will be described below, is as follows.

In an embodiment, the present disclosure provides a sensor cleaning system that is a sensor cleaning system for a hydrogen vehicle including hydrogen as fuel and includes a compression device configured to operate by a flow of the hydrogen, and one or more nozzles configured to spray a compressed fluid generated by the compression device onto a sensor.

According to some embodiments, the hydrogen vehicle includes a sensor cleaning system which includes a compression device disposed on a line through which hydrogen is supplied from a hydrogen tank to a fuel cell stack or a hydrogen engine and configured to generate a compressed fluid through a flow of the hydrogen, and one or more nozzles configured to spray the compressed fluid onto the sensor.

Other aspects and preferred embodiments of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
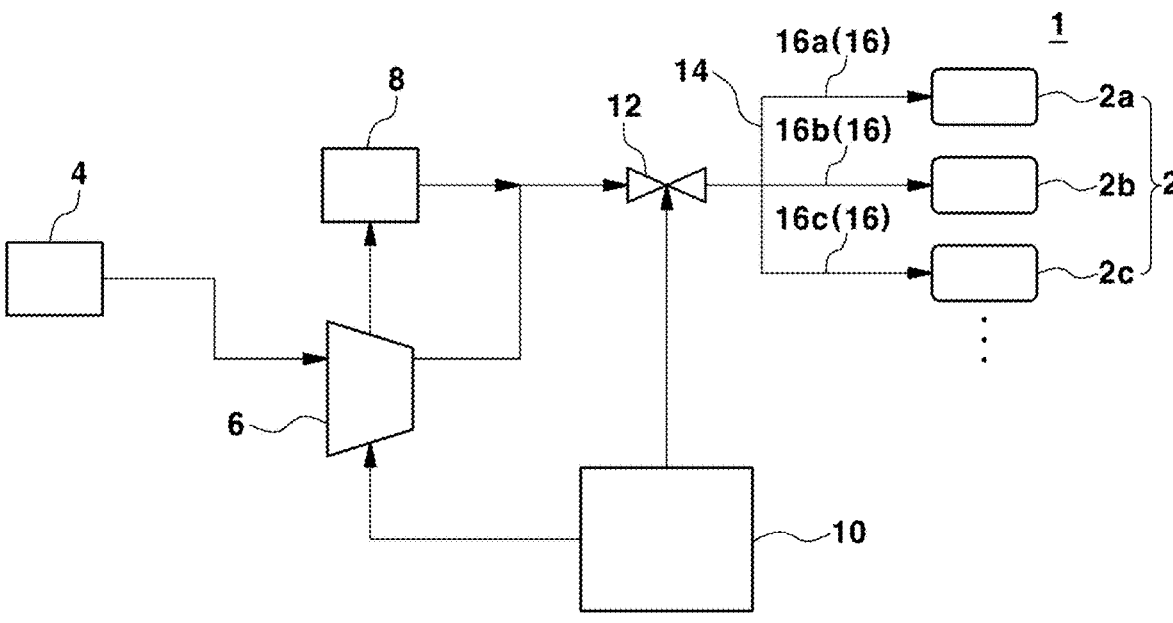
FIG. 1 is an exemplary block diagram illustrating a sensor cleaning system.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Specific structures or functional descriptions presented in embodiments of the present disclosure are merely an example for the purpose of describing the embodiments according to the concept of the present disclosure, and the embodiments according to the concept of the present disclosure may be implemented in various forms. In addition, the embodiments are not to be taken in a sense which limits the present disclosure to the specific embodiments and should be construed to include modifications, equivalents, or substitutes within the spirit and technical scope of the present disclosure.

Meanwhile, the terms first, second, and/or the like in the present disclosure may be used to describe various components, but the components are not limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected" or "coupled" to another component, the component may be directly connected or coupled to another component. However, it should be understood that another component may exist between the component and another component. On the contrary, when a component is referred to as being "directly connected to" or "directly in contact with" another component, it should be understood that another component may not be present between the component and another component. Other expressions describing the relationship between components, that is, "between" and "immediately between" or "adjacent to" and "directly adjacent to," should also be construed as described above.

Throughout the present specification, the same reference numerals indicate the same components. Meanwhile, terms used herein are for the purpose of describing the embodiments and are not intended to limit the present disclosure. As used herein, the singular forms include the plural forms as well unless the context clearly indicates otherwise. It is noted that the terms "comprises" and/or "comprising" used herein does not exclude the presence or addition of one or more other components, steps, operations, and/or elements in addition to stated components, steps, operations, and/or elements.

Hereinafter, embodiments of the present disclosure will be described in detail with reference to the accompanying drawings.

As described above, periodic cleaning of a sensor surface is necessary to maintain the performance of environmental sensors for detecting surrounding environment of a vehicle. For example, the environmental sensors may be contaminated by solids, such as dust and sand, and may be stained by liquids, such as raindrops or snow during precipitation.

In particular, in active autonomous vehicles, the vehicles are driven based on information on the surrounding environments, such as traffic lights, pedestrians, road types, buildings, and surrounding vehicles, which are recognized by the environmental sensors. When a surface of the environmental sensor is contaminated, recognition of the surrounding environment becomes impossible and active autonomous driving becomes impossible. Therefore, the sensor cleaning system of a vehicle performs an important function of enabling driving by assisting the environmental sensor to clearly perceive the surrounding environment without distortion and removing contaminants from the sensor surface.

These environmental sensors may be cleaned using a washer fluid or high-pressure air. In the former, the environmental sensor may be cleaned using a washer fluid, and moisture on the sensor surface may be removed through air spraying. In the latter, foreign materials on the sensor surface are removed by spraying only high-pressure air. In addition, there may be a cleaning method which uses a combination of the washer fluid and the high-pressure air.

Figure 2:
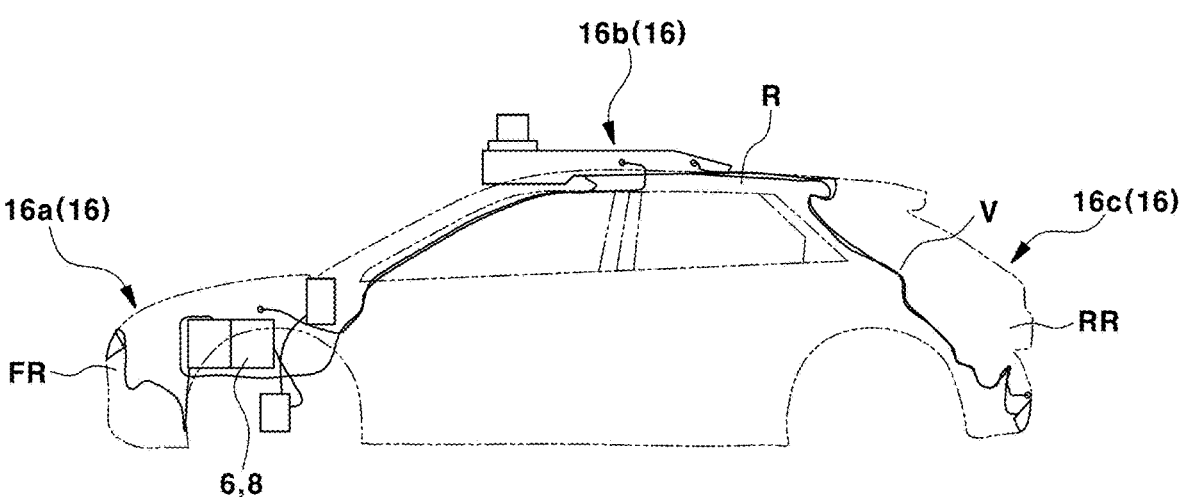
FIG. 2 is a diagram illustrating a vehicle including the sensor cleaning system.

An air cleaning type sensor cleaning system of the latter, which cleans environmental sensors by spraying compressed air, will be described with reference to FIGS. 1 and 2. A sensor cleaning system 1 is configured to clean environmental sensors using compressed air. The sensor cleaning system 1 performs cleaning by spraying the compressed air onto a surface of an environmental sensor 2. The environmental sensor 2 may include sensing devices, such as a light detection and ranging (LiDAR) sensor, a radio detection and ranging (RADAR) sensor, and cameras, and may be disposed in a front side FR, a rear side RR, a lateral side, and a roof R of a vehicle V.

Specifically, air filtered through an air filter 4 provided in the vehicle is introduced into a compressor 6. The air compressed by the compressor 6 is sprayed onto the surface of the environmental sensor 2 such that foreign materials on the environmental sensor 2 is removed. Of course, the environmental sensor 2 includes a plurality of environmental sensors 2a, 2b, and 2c, and three environmental sensors are shown in the drawings and specification, but the number of environmental sensors is not limited thereto and may be added or reduced.

In addition, the sensor cleaning system 1 includes an air tank 8. The air tank 8 may be filled with air compressed through the compressor 6 or air by an external device. The air filling in the air tank 8 may be used to clean the environmental sensor 2.

A controller 10 of the sensor cleaning system 1 is configured to operate a valve 12, for example, a solenoid valve, at preset intervals or in preset situations, such as when contamination of the environmental sensor 2 is detected. In this way, the compressed air is sprayed from the compressor 6 or the air tank 8 to the environmental sensor 2 so that the cleaning of the environmental sensor 2 is performed. A distributor 14 is provided at the valve 12 or integrally formed with the valve 12. Thus, as shown in FIG. 2, the compressed air may be distributed through nozzles 16a, 16b, 16c: collectively, 2 provided to the environmental sensors 2a, 2b, 2c: collectively, 2. As one example, the compressed air may also be a compressed fluid, such as a washer fluid.

When the compressed air is continuously sprayed onto the environmental sensor 2 while the vehicle V is traveling, contamination of the environmental sensor 2 may be prevented. In this regard, the applicant of the present disclosure has filed Korean Patent Application No. 10-2022-0124919 (Filing date: Sep. 30, 2022) regarding a "sensor protection device" capable of providing an air curtain to the environmental sensor 2. However, since there is a limit to an operation duration of the compressor 6 in the sensor cleaning system 1, it is impossible to continuously provide an air curtain on the environmental sensor 2. Therefore, currently, the sensor cleaning system 1 is controlled to perform air cleaning only in a setting time or form an air curtain.

Thus, according to the present disclosure, a compression device that can use a high pressure of a hydrogen tank, wasted from a hydrogen vehicle in a sensor cleaning system, and the sensor cleaning system including the same are provided.

Figure 3:
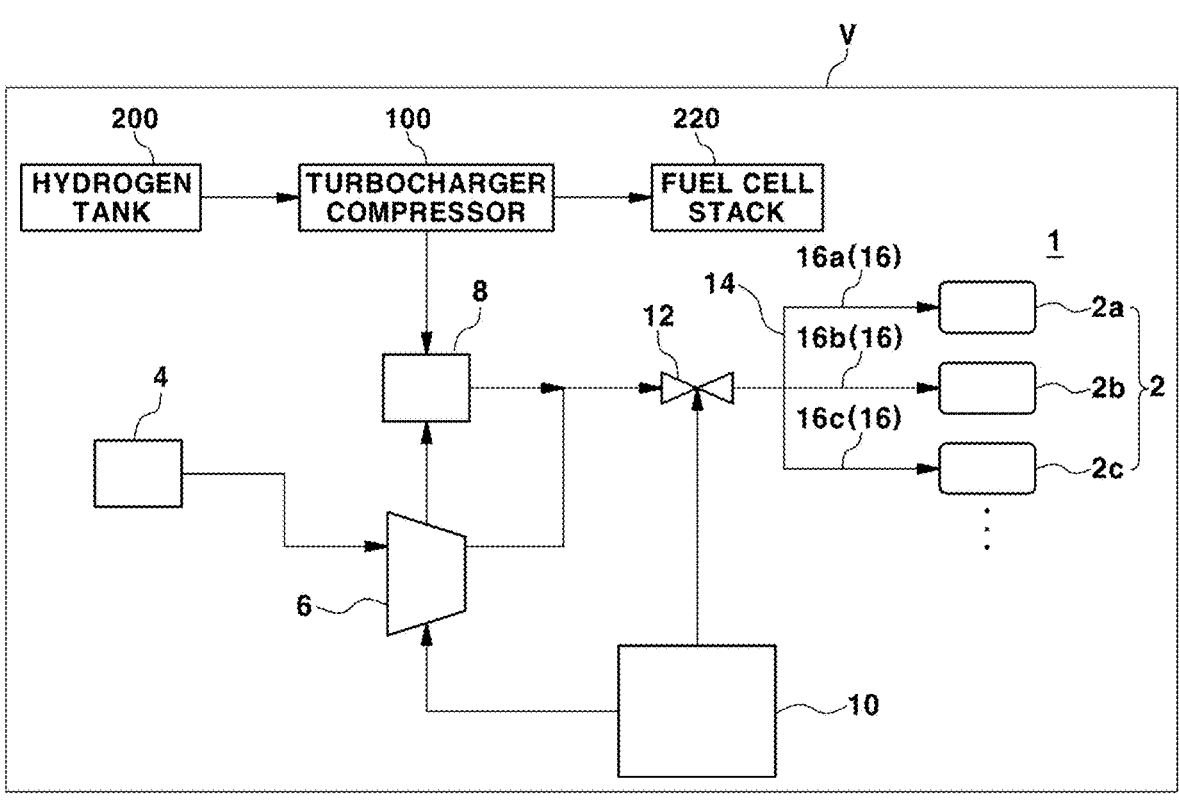
FIG. 3 is a block diagram illustrating a sensor cleaning system according to an embodiment of the present disclosure.

As shown in FIG. 3, the vehicle V may be a hydrogen vehicle. The hydrogen vehicle is a vehicle driven using hydrogen as fuel. The hydrogen vehicle may include a hydrogen fuel cell vehicle or a hydrogen engine vehicle. In the hydrogen fuel cell vehicle, a fuel cell may generate electrical energy through an electrochemical reaction between hydrogen, which is fuel, and oxygen in the air. In the hydrogen engine vehicle, similar to an existing internal combustion engine vehicle, the vehicle may be driven by explosively burning hydrogen with oxygen.

The hydrogen vehicle V includes a hydrogen tank 200. The hydrogen tank 200 stores hydrogen at high pressure. In addition, the vehicle V may include a fuel cell stack 220. The fuel cell stack 220 in the illustrated embodiment may be replaced with a hydrogen engine. However, hereinafter, a description of the hydrogen vehicle including the fuel cell stack 220 is made. Hydrogen supplied from the hydrogen tank 200 may be supplied to the fuel cell stack 220, and electrical energy may be generated through an electrochemical reaction that occurs in the fuel cell stack 220. For example, the generated electrical energy may be supplied to a motor of the vehicle V to drive the vehicle V.

The hydrogen in the hydrogen tank 200 is supplied through a hydrogen supply line to the fuel cell stack 220 as in the illustrated embodiment or injected into a hydrogen internal combustion engine. When the hydrogen is used in the fuel cell stack 220 or the hydrogen internal combustion engine, a pressure of the hydrogen in a high pressure state of hundreds of bar is reduced to a pressure of a use environment (for example, 16 bar, 36 bar, or the like). In other words, when the hydrogen is supplied, the pressure is lost in a pressure regulator of the hydrogen supply line.

Figure 4:
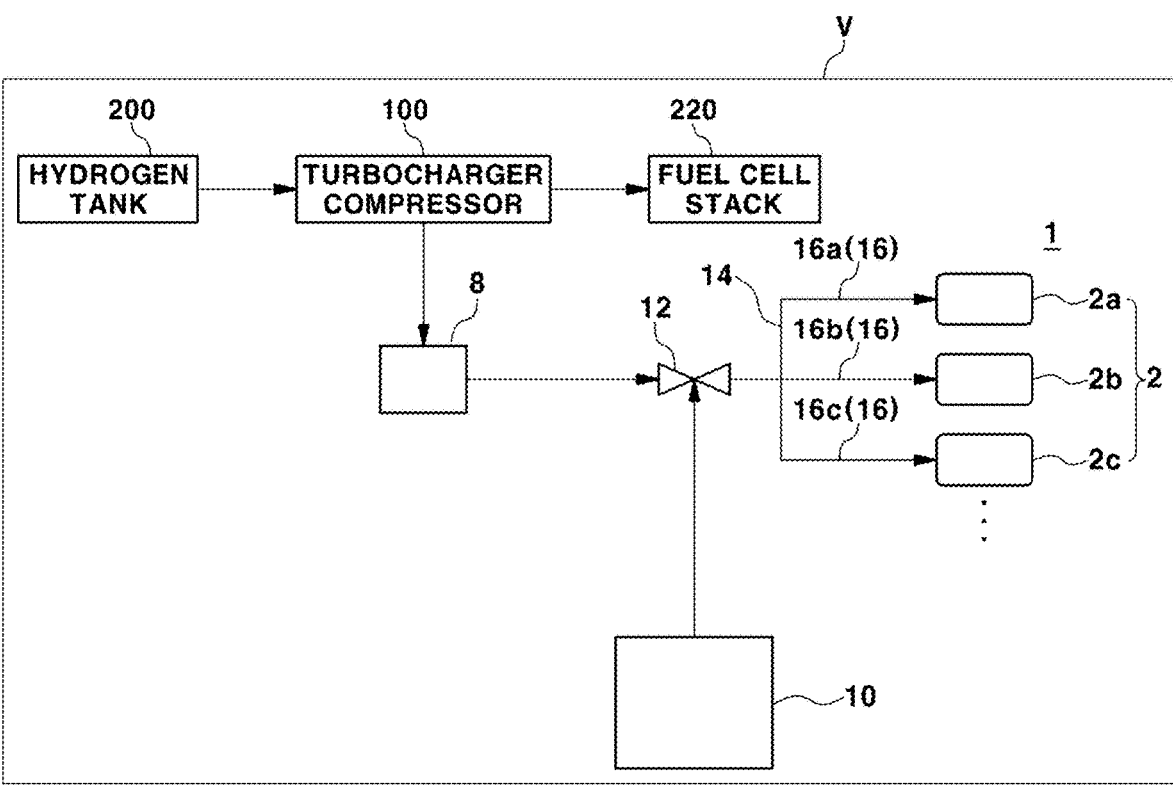
FIG. 4 is a block diagram illustrating a sensor cleaning system according to another embodiment of the present disclosure.

According to the present disclosure, the compressor of the sensor cleaning system 1 may be continuously driven while the vehicle V is traveling using the pressure, which is wasted during the hydrogen decompression process, as a pressure source. Thus, a compressed fluid, such as compressed air or a washer fluid, is constantly sprayed onto the environmental sensor 2 so that the air curtain may be formed. In some examples, as shown in FIG. 4, in the sensor cleaning system 1 according to the present disclosure, the compressor 6 provided in the sensor cleaning system may be omitted.

The sensor cleaning system according to the present disclosure includes a compression device 100 for directing wasted pressure to the sensor cleaning system 1. In one example, the compression device 100 may be a turbocharger compressor.

Figure 5:
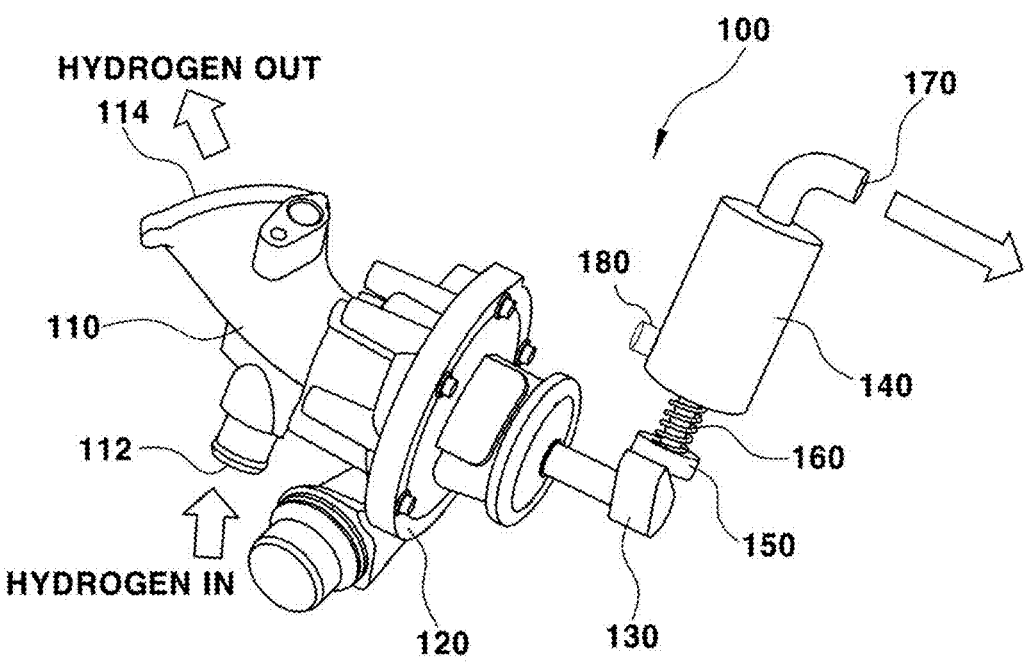
FIG. 5 is a perspective view illustrating a compression device according to an embodiment of the present disclosure.

As shown in FIG. 5, the compression device 100 is connected to a hydrogen supply line which fluidly communicates the hydrogen tank 200 with the fuel cell stack 220. In one example, the compression device 100 includes a hydrogen channel 110. The hydrogen channel 110 includes a hydrogen inlet 112 through which hydrogen in a high-pressure state is introduced and a hydrogen outlet 114 through which the hydrogen with reduced pressure while passing through the hydrogen channel 110 is discharged. The hydrogen inlet 112 may be connected in fluid communication with the hydrogen tank 200, and the hydrogen outlet 114 may be connected in fluid communication with the fuel cell stack 220.

The compression device 100 includes a turbine 120 and a cam shaft 130. The turbine 120 may receive rotational energy from a flow of the hydrogen through the hydrogen channel 110 to rotate the cam shaft 130.

The compression device 100 is operably connected to the compressor 140. Due to the rotation of the cam shaft 130, the compressor 140 may draw air and compress the drawn air. The compressor 140 may draw the compressed air into the compressor 140 through an air inlet 180 and discharge the compressed air through an air outlet 170. A position and a shape of the air inlet 180 or the air outlet 170 are not limited to the illustrated embodiment, and the air inlet 180 or the air outlet 170 may be placed at a different position or may have a different shape. In one example, the compressor 140 includes a piston 150 and a spring 160.

Figure 6:
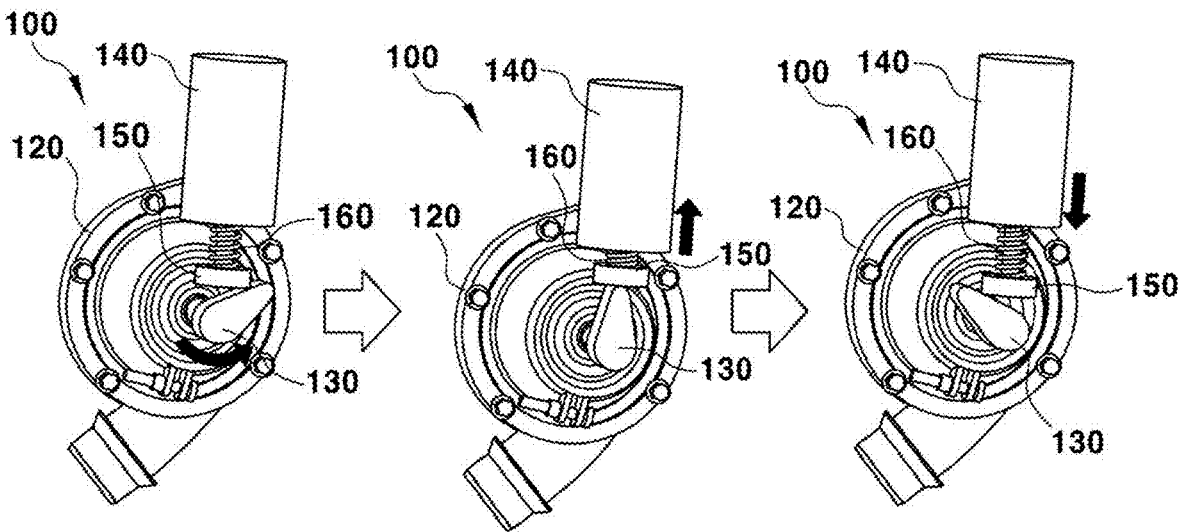
FIG. 6 is a diagram illustrating an operating process of the compression device of FIG. 5.

As shown in FIG. 6, the piston 150 is connected to the cam shaft 130 to perform a reciprocating motion by the cam shaft 130. The spring 160 is mounted at the piston 150.

When the cam shaft 130 is rotated and moved to a first position, the piston 150 is pressed and thus the spring 160 is compressed. When the cam shaft 130 is rotated and moved from the first position to a second position, the pressing force by the piston 150 is removed so that the spring 160 may return to its original position. As a stroke of the piston 150 is repeated, the compressed air is generated by the compressor 140. The generated compressed air may be directed to the sensor cleaning system 1 through the air outlet 170. For example, the generated compressed air may be stored in the air tank 8 of the sensor cleaning system 1. In one example, the generated compressed air may be directed to the environmental sensor 2.

In this way, the compressed air may be continuously sprayed onto the environmental sensor 2 of the sensor cleaning system 1 while the vehicle V is running. In other words, the cleaning of the environmental sensor 2 may be performed by the compression device 100, and a high-pressure air curtain may be constantly generated on the environmental sensor 2.

According to the present disclosure, a high-pressure air curtain or high-pressure air cleaning and/or washer fluid cleaning may be constantly operated by utilizing high-pressure hydrogen wasted in the hydrogen vehicle to drive the piston of the compression device without separate energy supply.

According to the present disclosure, contamination of the environmental sensor may be completely prevented by continuously operating the air cleaning and/or washer fluid cleaning without a compressor operation constraint condition even in any bad weather. Eventually, the marketability of autonomous vehicles may be maximized.

Moreover, according to the present disclosure, the compressor of the sensor cleaning system may be driven without power supply so that electricity efficiency of the vehicle may be improved.

Additionally, according to the present disclosure, a production cost and weight may be significantly reduced by omitting the compressor provided for the sensor cleaning system and/or the compressor for washer fluid cleaning.

In accordance with the present disclosure, a compression device capable of constantly forming an air curtain is provided to an environmental sensor of a hydrogen vehicle so that the environmental sensor can always be maintained in a clean state.

In addition, in accordance with the present disclosure, a sensor cleaning system including the compression device can be provided.

In accordance with the present disclosure, a weight and production cost of a hydrogen vehicle can be reduced by including the sensor cleaning system.

It should be noted that effects of the present disclosure are not limited to the above described effects, and other effects of the present disclosure not mentioned above can be clearly understood by those skilled in the art from the foregoing descriptions.

It should be understood that the present disclosure is not limited to the above described embodiments and the accompanying drawings, and various substitutions, modifications, and alterations can be devised by those skilled in the art without departing from the technical spirit of the present disclosure.

The invention claimed is:

1. A sensor cleaning system for a hydrogen vehicle using hydrogen as fuel, the system comprising:

a compression device configured to operate by a flow of the hydrogen; and one or more nozzles configured to spray a compressed fluid generated by the compression device onto a sensor, wherein the compression device includes:

a turbine configured to rotate by the flow of the hydrogen;

a cam shaft rotatably connected to the turbine; and a compressor configured to generate the compressed fluid by a rotation of the cam shaft.

2. The system of claim 1, wherein the compressor includes:

a piston compressible by the cam shaft; and a spring mounted on the piston and compressed or extended by a movement of the piston.

3. The system of claim 1, wherein the compression device further includes a hydrogen channel through which the hydrogen which rotates the turbine flows.

4. The system of claim 1, wherein the hydrogen vehicle includes a fuel cell stack or a hydrogen engine.

5. The system of claim 1, wherein the sensor includes a light detection and ranging (LiDAR) sensor, a radio detection and ranging (RADAR) sensor, or a camera, disposed in the hydrogen vehicle.

6. The system of claim 1, wherein the compressed fluid is compressed air or a washer fluid.

7. A hydrogen vehicle including a sensor cleaning system, the hydrogen vehicle comprising:

a compression device disposed on a line through which hydrogen is supplied from a hydrogen tank to a fuel cell stack or a hydrogen engine and configured to generate a compressed fluid through a flow of the hydrogen; and one or more nozzles configured to spray the compressed fluid onto the sensor.

8. The hydrogen vehicle of claim 7, wherein the sensor cleaning system includes:

a fluid tank configured to store the generated compressed fluid and connected to the one or more nozzles;

an openable valve configured to allow or block a flow of the compressed fluid from the fluid tank to the one or more nozzles; and a controller configured to control opening and closing of the valve.

9. The hydrogen vehicle of claim 7, wherein the compression device includes:

a turbine configured to rotate by the flow of the hydrogen;

a cam shaft rotatably connected to the turbine; and a compressor configured to generate the compressed fluid by a rotation of the cam shaft.

10. The hydrogen vehicle of claim 7, wherein the sensor cleaning system does not include a separate compressor other than the compression device.

* * * * *